United States Patent
Qi et al.

(10) Patent No.: US 12,355,671 B2
(45) Date of Patent: Jul. 8, 2025

(54) DATA TRANSMISSION METHOD AND APPARATUS

(71) Applicant: HUAWEI TECHNOLOGIES CO., LTD., Guangdong (CN)

(72) Inventors: Caixia Qi, Shanghai (CN); Han Zhou, Shanghai (CN); Hancheng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 399 days.

(21) Appl. No.: 17/886,008

(22) Filed: Aug. 11, 2022

(65) Prior Publication Data

US 2022/0385589 A1    Dec. 1, 2022

Related U.S. Application Data

(63) Continuation of application No. PCT/CN2020/134267, filed on Dec. 7, 2020.

(30) Foreign Application Priority Data

Feb. 12, 2020   (CN) .......................... 202010089277.1

(51) Int. Cl.
  *H04L 12/66* (2006.01)
  *H04L 1/1607* (2023.01)
  (Continued)

(52) U.S. Cl.
  CPC ............ *H04L 47/34* (2013.01); *H04L 1/1642* (2013.01); *H04L 12/4633* (2013.01); *H04W 28/06* (2013.01)

(58) Field of Classification Search
  CPC . H04W 36/08; H04W 36/0016; H04W 76/12; H04W 36/0235; H04W 36/0077;
  (Continued)

(56) References Cited

U.S. PATENT DOCUMENTS

2002/0114293 A1   8/2002 Madour et al.
2013/0182705 A1   7/2013 Avni et al.
(Continued)

FOREIGN PATENT DOCUMENTS

CN    109150388 A    1/2019
CN    110099403 A    8/2019
(Continued)

OTHER PUBLICATIONS

Huawei et al., "update to Solution#3 and Solution#4," SA WG2 Meeting #129Bis, S2-1812087, West Palm Beach, USA, Nov. 26-30, 2018, 13 pages.
(Continued)

*Primary Examiner* — Kharye Pope
(74) *Attorney, Agent, or Firm* — Fish & Richardson P.C.

(57) ABSTRACT

A data transmission method and apparatus are provided. One example method involves establishing two tunnels between an access network device and a user plane function network element, where the two tunnels may be tunnels used for downlink data transmission or tunnels used for uplink data transmission. When communicating with the user plane function network element, the access network device may transmit two data packets. In this way, when one data packet is lost, the receive end may further receive the other data packet.

20 Claims, 6 Drawing Sheets

(51) Int. Cl.
*H04L 12/46* (2006.01)
*H04L 47/34* (2022.01)
*H04W 28/06* (2009.01)

(58) Field of Classification Search
CPC .......... H04W 36/26; H04L 1/08; H04L 47/34; H04L 1/00; H04L 67/562; H04L 1/189; H04L 1/1841; H04L 1/1854; H04L 2001/0096; H04L 65/60; H04L 45/00; H04M 15/8228; H04M 15/8016; H04M 15/85; H04M 15/62; H04M 15/8214
See application file for complete search history.

(56) References Cited

U.S. PATENT DOCUMENTS

| | | |
|---|---|---|
| 2018/0146478 A1 | 5/2018 | Kim et al. |
| 2018/0270718 A1* | 9/2018 | Wang .................. H04L 1/08 |
| 2020/0112898 A1* | 4/2020 | Ramle .................. H04W 8/08 |
| 2020/0344655 A1* | 10/2020 | Rommer ............... H04W 76/36 |
| 2021/0037585 A1* | 2/2021 | Youn .................... H04W 60/06 |
| 2021/0360506 A1* | 11/2021 | Yang .................... H04W 40/02 |
| 2022/0200813 A1* | 6/2022 | Thiebaut ............. H04L 12/1407 |

FOREIGN PATENT DOCUMENTS

| | | |
|---|---|---|
| CN | 110351024 A | 10/2019 |
| CN | 110351030 A | 10/2019 |
| CN | 110519864 A | 11/2019 |
| CN | 111787580 A | 10/2020 |
| WO | 2019192306 A1 | 10/2019 |
| WO | 2019223405 A1 | 11/2019 |

OTHER PUBLICATIONS

Extended European Search Report in European Appln No. 20918560.2, dated Oct. 24, 2023, 12 pages.
Huawei, "Destination Address and Forwarding Path based Routing for IAB," 3GPP TSG-RAN WG3 Meeting #99, R3-180816, Athens, Greece, Feb. 26-Mar. 2, 2018, 4 pages.
3GPP TS 23.007 V16.0.0, "3rd Generation Partnership Project; Technical Specification Group Core Network and Terminals; Restoration procedures (Release 16)," Dec. 2019, 107 pages.
3GPP TS 23.501 V16.3.0, "3rd Generation Partnership Project; Technical Specification Group Services and System Aspects; System architecture for the 5G System (5GS); Stage 2 (Release 16)," Dec. 2019, 417 pages.
3GPP TS 29.244 V16.2.0, "3rd Generation Partnership Project;Technical Specification Group Core Network and Terminals; Interface between the Control Plane and the User Plane Nodes;Stage 3 (Release 16)," Dec. 2019, 281 pages.
3GPP TS 38.415 V15.2.0, "3rd Generation Partnership Project; Technical Specification Group Radio Access Network; NG-RAN; PDU Session User Plane Protocol (Release 15)," Dec. 2018, 12 pages.
Office Action in Chinese Appln. No. 202010089277.1, dated Sep. 2, 2022, 21 pages (with English translation).
International Search Report and Written Opinion in International Appln. No. PCT/CN2020/134267, mailed on Mar. 9, 2021, 18 pages (with English translation).

* cited by examiner

DATA TRANSMISSION METHOD AND APPARATUS

CROSS-REFERENCE TO RELATED APPLICATIONS

This application is a continuation of International Patent Application No. PCT/CN2020/134267, filed on Dec. 7, 2020, which claims priority to Chinese Patent Application No. 202010089277.1, filed on Feb. 12, 2020. The disclosures of the aforementioned applications are hereby incorporated by reference in their entireties.

TECHNICAL FIELD

Embodiments of this application relate to the field of communication technologies, and in particular, to a data transmission method and apparatus.

BACKGROUND

In a current wireless communication system, an uplink data transmission tunnel or a downlink data transmission tunnel may be separately established between an access network device and a user plane function network element. During downlink data transmission, a data network may send a downlink data packet to the user plane function network element, the user plane function network element forwards the downlink data packet to the access network device through the downlink data transmission tunnel, and then the access network device forwards the downlink data packet to a terminal device. During uplink data transmission, the terminal device may send an uplink data packet to the access network device, the access network device forwards the uplink data packet to the user plane function network element through the uplink data transmission tunnel, and then the user plane function network element forwards the uplink data packet to the data network. Packet loss may occur regardless of the downlink data packet or the uplink data packet. Therefore, how to improve data transmission reliability is a current research hotspot.

SUMMARY

Embodiments of this application provide a data transmission method and apparatus, to improve data transmission reliability.

According to a first aspect, a data transmission method is provided, and the method may be applied to downlink data transmission. The method may be performed by a user plane function network element, or may be performed by a component (for example, a processor, a chip, or a chip system) in the user plane function network element, and includes: receiving a first data packet from a data network; determining first indication information based on the first data packet, where the first indication information indicates the user plane function network element to perform redundant transmission; replicating the first data packet based on the first indication information, to obtain a second data packet; and sending the first data packet and the second data packet to an access network device via a first tunnel and a second tunnel respectively, where the first data packet and the second data packet carry a first sequence number. The first tunnel and the second tunnel may be tunnels for downlink data transmission. The first data packet may be referred to as an original downlink data packet, and the second data packet may be referred to as a replicated downlink data packet.

According to the foregoing method, the user plane function network element may send two data packets to the access network device: the first data packet and the second data packet. In this way, when one of the two data packets is dropped, the access network device may further receive the other data packet, thereby improving data transmission reliability.

In a possible design, a downlink data packet detection rule may be determined based on the first data packet, and the downlink data packet detection rule includes the first indication information.

In the foregoing design, the first indication information may also be referred to as a redundant transmission indication. The redundant transmission indication means that when receiving the downlink data packet sent by the data network, the user plane function network element replicates the downlink data packet, and sends the original downlink data packet and the replicated downlink data packet to the access network device via the two tunnels.

In another possible design, a first forwarding rule (FAR) associated with a downlink data packet detection rule may be determined based on the first data packet, where the first FAR includes the first indication information.

In a possible design, the first FAR associated with the downlink data packet detection rule further includes second indication information, and the second indication information indicates the user plane function network element to add a sequence number to the first data packet and the second data packet. The method further includes: adding the first sequence number to the first data packet and the second data packet based on the second indication information.

According to the foregoing method, after receiving the first data packet and/or the second data packet, the access network device may distinguish between the original downlink data packet and the replicated downlink data packet based on the first sequence number in the first data packet and/or the second data packet. For example, after the access network device receives the first data packet and/or the second data packet, the access network device may determine whether the first sequence number is stored in service data flow context. If the first sequence number is stored, it indicates that the first data packet or the second data packet is a replicated data packet and needs to be discarded, and the first sequence number is deleted from the service data flow context. If the first sequence number is not stored, the access network device considers that the first data packet or the second data packet as an original data packet, forwards the first data packet or the second data packet to a terminal device, and adds the first sequence number to the service flow context.

It should be noted that, in the design of the first aspect, if the access network device receives the first data packet earlier than the second data packet, the access network device may forward the first data packet and drop the second data packet. The access network device considers the first data packet as an original data packet, and the second data packet as a replicated data packet. Alternatively, if the access network device receives the second data packet earlier than the first data packet, the access network device may forward the second data packet and drop the first data packet. The access network device considers the second data packet as an original data packet, and the first data packet as a replicated data packet.

According to a second aspect, a data transmission method is provided. The method may be performed by a user plane function network element, or may be performed by a component (for example, a processor, a chip, or a chip system)

in the user plane function network element. The method may be applied to uplink data transmission, and includes: receiving a first data packet from an access network device via a first tunnel, where the first data packet carries a first sequence number; determining an uplink data packet detection rule based on the first data packet; and storing the first sequence number in the uplink data packet detection rule or deleting the first sequence number from the uplink data packet detection rule based on the uplink data packet detection rule. The first tunnel and the second tunnel may be uplink data transmission tunnels. The first data packet may be referred to as an original uplink data packet, and a second data packet may be referred to as a replicated uplink data packet.

According to the foregoing method, the access network device sends two data packets to the user plane function network element via the first tunnel and the second tunnel. In this way, when one of the data packets is dropped, the user plane function network element may further receive the other data packet, thereby improving data transmission reliability.

In a possible design, the uplink data packet detection rule includes third indication information, the third indication information indicates the user plane function network element to detect a redundant data packet. The user plane function network element may store the first sequence number in the uplink data packet detection rule or delete the first sequence number from the uplink data packet detection rule based on the third indication information included in the uplink data packet detection rule.

Specifically, if the uplink data packet detection rule does not include the first sequence number, the user plane function network element stores the first sequence number in the uplink data packet detection rule. Alternatively, if the uplink data packet detection rule includes the first sequence number, the user plane function network element deletes the first sequence number from the uplink data packet detection rule.

In a possible design, the method further includes: forwarding the first data packet to a data network if the uplink data packet detection rule does not include the first sequence number; or dropping the first data packet if the uplink data packet detection rule includes the first sequence number.

In a possible design, if the uplink data packet detection rule does not include the first sequence number, the first data packet may be forwarded to the data network based on fourth indication information included in a second forwarding rule FAR associated with the uplink data packet detection rule, where the fourth indication information indicates the user plane function network element to forward an original uplink data packet or drop a replicated uplink data packet.

Specifically, if the uplink data packet detection rule includes the first sequence number, the first data packet may be dropped based on fourth indication information included in a second forwarding rule FAR associated with the uplink data packet detection rule, where the fourth indication information indicates the user plane function network element to forward an original uplink data packet or drop a replicated uplink data packet.

It may be understood that if the user plane function network element drops the first data packet, the user plane function network element forwards the second data packet, or if the user plane function network element forwards the first data packet, the user plane function network element drops the second data packet.

It should be noted that, in the design of the second aspect, if the user plane function network element receives the first data packet earlier than the second data packet, the user plane function network element considers the first data packet as an original uplink data packet and the second data packet as a replicated uplink data packet, forwards the first data packet, and drops the second data packet. Similarly, if the user plane function network element receives the second data packet earlier than the first data packet, the user plane function network element considers the second data packet as an original uplink data packet and the first data packet as a replicated uplink data packet, forwards the second data packet, and drops the first data packet.

According to a third aspect, a tunnel setup or update method is provided. The method may be used for setup or update of a first tunnel and/or a second tunnel between an access network device and a user plane function network element. The method may be performed by a session management function network element, or may be performed by a component (for example, a processor, a chip, or a chip system) in the session management function network element. The method includes:

sending a first request message to a user plane function network element, where the first request message requests setup or update of a transmission tunnel between the user plane function network element and an access network device; and receiving a first response message from the user plane function network element.

The first request message includes one or more of the following parameters: a downlink data packet detection rule, where the downlink data packet detection rule includes first indication information, and the first indication information indicates the user plane function network element to perform redundant transmission; a first forwarding rule (FAR) associated with the downlink data packet detection rule, where the first FAR includes first indication information and/or second indication information, the first indication information indicates the user plane function network element to perform redundant transmission, and the second indication information indicates the user plane function network element to add a same sequence number to a received downlink data packet and a replicated downlink data packet; an uplink data packet detection rule, where the uplink data packet detection rule includes third indication information, and the third indication information indicates the user plane function network element to detect a redundant data packet; and a second FAR associated with the uplink data packet detection rule, where the second FAR includes fourth indication information, and the fourth indication information indicates the user plane function network element to forward an original uplink data packet or drop a replicated uplink data packet.

According to the foregoing method, two tunnels between the access network device and the user plane function network element may be set up or updated. The two tunnels may be tunnels for downlink data transmission or tunnels for uplink data transmission. In this way, two data packets may be transmitted during communication between the access network device and the user plane function network element. If one data packet is lost, the receive end can receive the other data packet. This improves data transmission reliability.

According to a fourth aspect, an embodiment of this application provides an apparatus. The apparatus may implement the method according to any one of the first aspect or the possible implementations of the first aspect. The apparatus includes a corresponding unit or component configured to perform the foregoing method. The unit included in the apparatus may be implemented by using software and/or hardware. The apparatus may be, for example, a user plane function network element, or a chip, a chip system, a processor, or the like that can support the user plane function network element in implementing the foregoing method.

According to a fifth aspect, an embodiment of this application provides an apparatus. The apparatus may implement the method according to any one of the second aspect or the possible implementations of the second aspect. The apparatus includes a corresponding unit or component configured to perform the foregoing method. The unit included in the apparatus may be implemented by using software and/or hardware. The apparatus may be, for example, a user plane function network element, or a chip, a chip system, a processor, or the like that can support the user plane function network element in implementing the foregoing method.

According to a sixth aspect, an embodiment of this application provides an apparatus. The apparatus may implement the method according to any one of the third aspect or the possible implementations of the third aspect. The apparatus includes a corresponding unit or component configured to perform the foregoing method. The unit included in the apparatus may be implemented by using software and/or hardware. The apparatus may be, for example, a session management function network element, or a chip, a chip system, or a processor that can support the session management function network element in implementing the foregoing method.

According to a seventh aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the first aspect or the possible implementations of the first aspect.

According to an eighth aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the second aspect or the possible implementations of the second aspect.

According to a ninth aspect, an embodiment of this application provides an apparatus. The apparatus includes a processor. The processor is coupled to a memory. The memory is configured to store a program or instructions. When the program or the instructions are executed by the processor, the apparatus is enabled to implement the method according to any one of the third aspect or the possible implementations of the third aspect.

According to a tenth aspect, an embodiment of this application provides a computer-readable storage medium. The computer-readable storage medium stores a computer program or instructions. When the computer program or the instructions are executed, a computer is enabled to perform the method according to any one of the first aspect or the possible implementations of the first aspect.

According to an eleventh aspect, an embodiment of this application provides a computer-readable storage medium. The computer-readable storage medium stores a computer program or instructions. When the computer program or the instructions are executed, a computer is enabled to perform the method according to any one of the second aspect or the possible implementations of the second aspect.

According to a twelfth aspect, an embodiment of this application provides a computer-readable storage medium. The computer-readable storage medium stores a computer program or instructions. When the computer program or the instructions are executed, a computer is enabled to perform the method according to any one of the third aspect or the possible implementations of the third aspect.

According to a thirteenth aspect, an embodiment of this application provides a computer program product. The computer program product includes computer program code. When the computer program code is run on a computer, the computer is enabled to perform the method according to any one of the first aspect or the possible implementations of the first aspect.

According to a fourteenth aspect, an embodiment of this application provides a computer program product. The computer program product includes computer program code. When the computer program code is run on a computer, the computer is enabled to perform the method according to any one of the second aspect or the possible implementations of the second aspect.

According to a fifteenth aspect, an embodiment of this application provides a computer program product. The computer program product includes computer program code. When the computer program code is run on a computer, the computer is enabled to perform the method according to any one of the third aspect or the possible implementations of the third aspect.

According to a sixteenth aspect, an embodiment of this application provides a chip. The chip includes a processor. The processor is coupled to a memory. The memory is configured to store a program or instructions. When the program or the instructions are executed by the processor, the chip is enabled to implement the method according to any one of the first aspect or the possible implementations of the first aspect.

According to a seventeenth aspect, an embodiment of this application provides a chip. The chip includes a processor. The processor is coupled to a memory. The memory is configured to store a program or instructions. When the program or the instructions are executed by the processor, the chip is enabled to implement the method according to any one of the second aspect or the possible implementations of the second aspect.

According to an eighteenth aspect, an embodiment of this application provides a chip. The chip includes a processor. The processor is coupled to a memory. The memory is configured to store a program or instructions. When the program or the instructions are executed by the processor, the chip is enabled to implement the method according to any one of the third aspect or the possible implementations of the third aspect.

DESCRIPTION OF EMBODIMENTS

Figure 1:
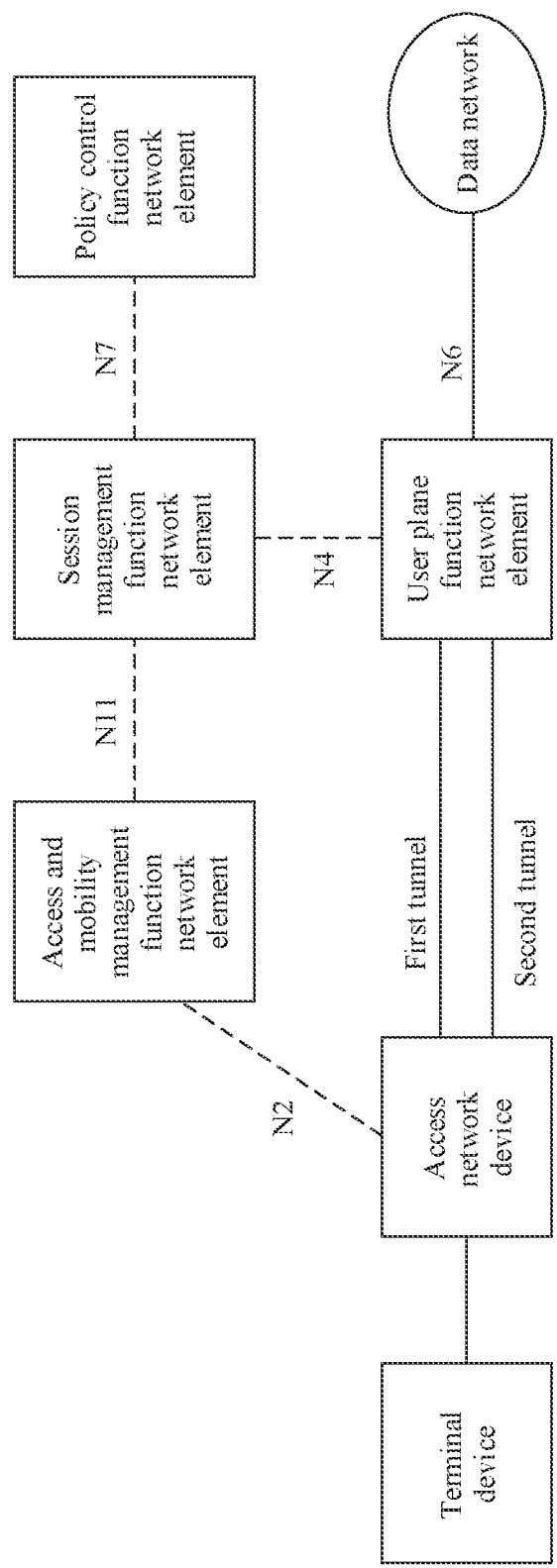
FIG. 1 is a network architecture according to an embodiment of this application.

A data transmission method and apparatus provided in embodiments of this application may be applied to a network architecture. As shown in FIG. 1, a network architecture is provided, including a terminal device, an access network device, a user plane function network element, and a data network. Two tunnels, that is, a first tunnel and a second tunnel, may be established for data transmission between the access network device and the user plane function network element. It should be noted that in embodiments of this application, a tunnel and a channel are not distinguished from each other, and may be used interchangeably. For example, the first tunnel and the second tunnel may also be referred to as an N3 channel 1 and an N3 channel 2. It should be noted that a tunnel for uplink data transmission may be different from a tunnel for downlink data transmission. In other words, the access network device sets up two tunnels for downlink data transmission, and the user plane function network element sets up two tunnels for uplink data transmission. The first tunnel and the second tunnel may be used for uplink data transmission or downlink data transmission. It may be understood that, in the description of embodiments of this application, the first tunnel and the second tunnel used for downlink data transmission are referred to as downlink data transmission tunnels, and the first tunnel and the second tunnel used for uplink data transmission are referred to as uplink data transmission tunnels. The tunnel may be identified by identification information of a data receive end. To be specific, the downlink data transmission tunnel may be identified by identification information of the access network device, and the uplink data transmission tunnel may be identified by identification information of the user plane function network element.

In a possible example, the data network may send a downlink data packet to the user plane function network element, and the user plane function network element may replicate the downlink data packet. Then, the user plane function network element may transmit the original downlink data packet and the replicated downlink data packet to the access network device via the first tunnel and the second tunnel respectively. After receiving the two downlink data packets, the access network device drops one of the downlink data packets, and forwards the other downlink data packet to the terminal device. In this example, the first tunnel and the second tunnel are downlink data transmission tunnels.

In another possible example, the terminal device sends an uplink data packet to the access network device, and the access network device replicates the uplink data packet. Then, the access network device sends the original uplink data packet and the replicated uplink data packet to the user plane function network element via the first tunnel and the second tunnel respectively. After receiving the two uplink data packets, the user plane function network element drops one of the uplink data packets, and forwards the other uplink data packet to the data network. In this example, the first tunnel and the second tunnel are uplink data transmission tunnels.

Optionally. FIG. 1 is only an example for description, and is not intended to limit embodiments of this application. For example, the network architecture shown in FIG. 1 may further include one or more of an access and mobility management function network element, a session management function network element, a policy control function network element, or the like. The terminal device may access a wireless network via an access network device at a current location, and the access and mobility management function network element may be configured for device registration, security authentication, mobility management, location management, and the like of the terminal device. The session management function network element may be configured for session establishment, update, deletion, and the like of the terminal device. The user plane function network element may be configured for data packet forwarding between the terminal device and an external data network, and the like. The policy function network element may be configured for policy control such as charging and quality of service (QoS) control of the terminal device. The data network may include an application server, configured to provide an application service and the like for the terminal device.

It should be noted that the network architecture shown in FIG. 1 may be applied to mobile communication networks of different standards. For example, when the network architecture shown in FIG. 1 is applied to a fifth-generation mobile communication network, the access and mobility management function network element may be an access and mobility management function (AMF) network element, and the session management function network element may be a session management function (SMF) network element, the user plane function network element may be a user plane function (UPF) network element, and the policy function may be a policy control function (PCF) network element or the like.

In addition, it should be noted that in embodiments of this application, terms such as "first" and "second" are only used for distinguishing and description, and cannot be understood as an indication or implication of relative importance, an indication or implication of an order, or the like. "At least one" means one or more, and "a plurality of" means two or more. "And/or" describes an association relationship between associated objects and represents that three relationships may exist. For example, A and/or B may represent the following cases: Only A exists, both A and B exist, and only B exists, where A and B each may be singular or plural. The character "/" generally indicates an "or" relationship between the associated objects. "At least one of the following items (pieces)" or a similar expression thereof means any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

Based on the network architecture shown in FIG. 1, embodiments of this application provide a data transmission method and apparatus. A principle is as follows: During downlink data transmission, a user plane function network element replicates an original downlink data packet to obtain two downlink data packets, and adds a same sequence number to the two downlink data packets. The access network device forwards one received downlink data packet to the terminal device, and drops the other received downlink data packet. For example, the access network device may forward the downlink data packet received earlier to the terminal device, and drop the downlink data packet received later based on a sequence of receiving the two downlink data packets. During uplink data transmission, the access network device replicates an original uplink data packet to obtain two uplink data packets, and adds a same sequence number to the two uplink data packets. The user plane function network element forwards one received uplink data packet to a data network, and drops the other received uplink data packet. For example, the user plane function network element may drop the uplink data packet received later, and forward the uplink data packet received earlier to the data network based on a sequence of receiving the two uplink data packets. In the method and the apparatus in this application, after one data packet transmitted on a tunnel is lost, the user plane function network element or the access network device may further receive the other data packet via the other tunnel, to improve data transmission reliability. This implements highly reliable data transmission on the network.

The technologies described in embodiments of this application may be applied to various communication systems, for example, a 4th generation (4G) communication system, a 4.5G communication system, a 5G communication system, a system converged by a plurality of communication systems, and a future evolved communication system (for example, a 6G communication system). The communication systems include, for example, a long term evolution (LTE) system, a new radio (NR) system, an internet of things system, an internet of vehicles system, a wireless fidelity (Wi-Fi) system, a communication system related to the 3rd generation partnership project (3GPP), and another communication system of this type.

Figure 2:
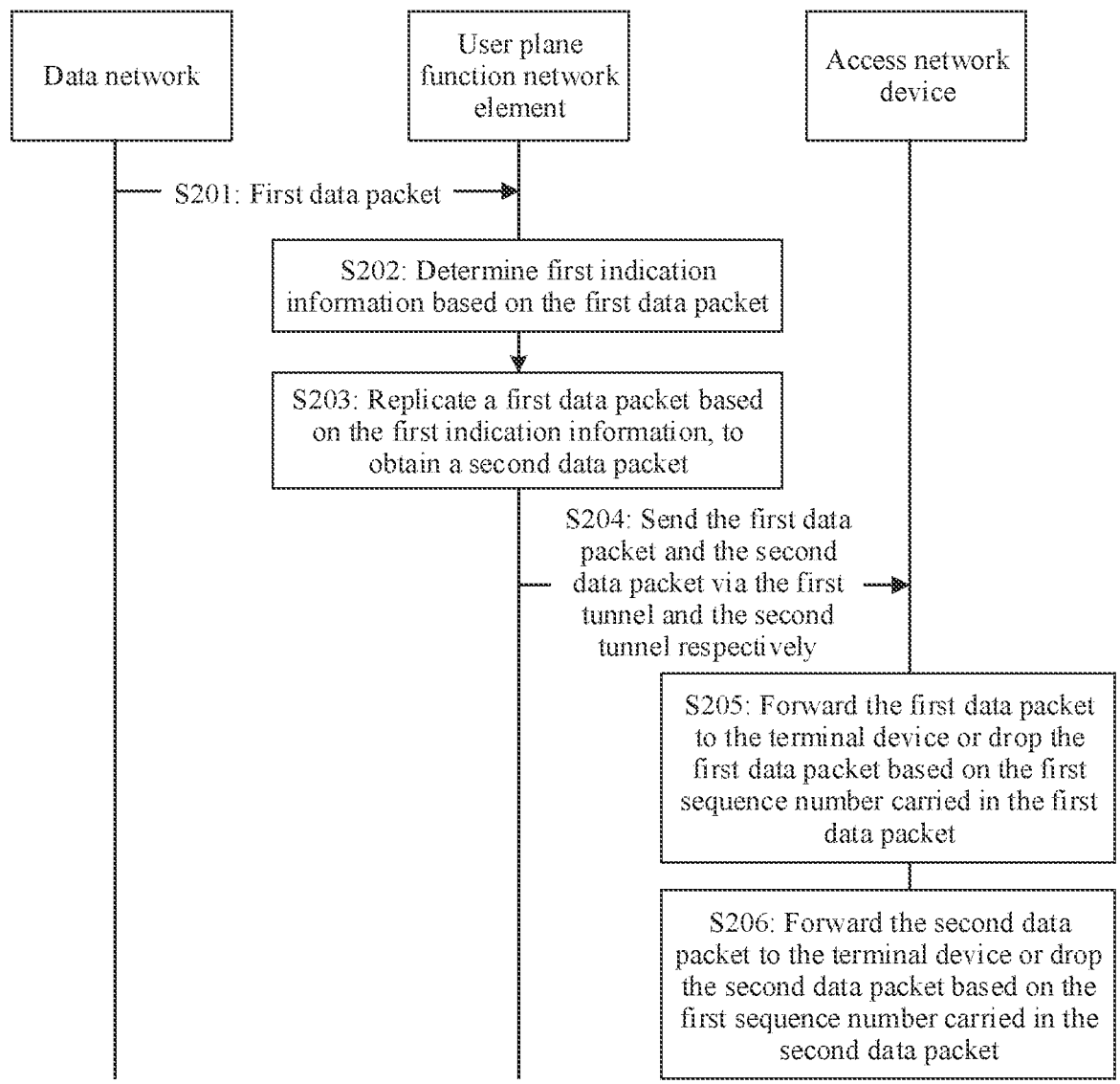
FIG. 2 is a schematic flowchart of a data transmission method according to an embodiment of this application.

As shown in FIG. 2, a process of a data transmission method is provided. The process may be applied to downlink data transmission. A first tunnel and a second tunnel in the process are downlink data transmission tunnels. Execution bodies of the process include a data network, a user plane function network element, an access network device, a terminal device, and the like. Alternatively, the data network in the process may be a component (for example, a processor, a chip, or a chip system) in the data network, the user plane function network element in the process may be a component (for example, a processor, a chip, or a chip system) in the user plane function network element, the access network device in the process may be a component (for example, a processor, a chip, or a chip system) in the access network device, and the terminal device in the procedure may be a component (for example, a processor, a chip, or a chip system) in the terminal device. The process includes the following steps.

S201: The data network sends a first data packet to the user plane function network element, where the first data packet may also be referred to as an original downlink data packet. Correspondingly, the user plane function network element receives the first data packet from the data network.

S202: The user plane function network element determines first indication information based on the first data packet, where the first indication information indicates the user plane function network element to perform redundant transmission.

In a possible example, the user plane function network element determines a downlink data packet detection rule (DL PDR) based on the first data packet, where the downlink data packet detection rule includes the first indication information. For example, the user plane function network element may obtain matching information in the first data packet, such as a source IP address, a destination IP address, a source port number, and a destination port number in the first data packet. The user plane function network element matches a downlink data packet detection rule based on the matching information in the first data packet. For example, when a downlink data packet detection rule and the first data packet include same matching information, it may be considered that the downlink data packet detection rule is the determined downlink data packet detection rule. The first indication information may also be referred to as a redundant transmission indication for indicating the user plane function network element to perform redundant transmission. The redundant transmission may be specifically: The user plane function network element replicates a received downlink data packet, and transmits the original downlink data packet and the replicated downlink data packet to the access network device separately via the foregoing two tunnels.

The first indication information may be carried in the following manners.

1. A parameter is added to the downlink data packet detection rule, and the parameter is the first indication information.

For example, the parameter may be indicated by one bit. When the bit is set to 1, it indicates that redundant transmission needs to be performed. When the bit is set to 0, it indicates that redundant transmission does not need to be performed or indicates no special meaning. Alternatively, when the bit is set to 0, it indicates that redundant transmission needs to be performed. When the bit is set to 1, it indicates that redundant transmission does not need to be performed or indicates no special meaning. Alternatively, the parameter may be indicated in an enumeration manner. For example, a specific enumerated value is used to indicate that redundant transmission needs to be performed.

2. An original parameter in the downlink data packet detection rule is extended, and the extended parameter is the first indication information.

For example, the downlink data packet detection rule includes an original parameter, and the original parameter includes two bits: a first bit and a second bit. The first bit of the original parameter has a specific meaning, and the second bit has no specific meaning. In this embodiment of this application, the second bit of the original parameter may be used to indicate whether redundant transmission needs to be performed. For example, when the second bit is 1, it may indicate that redundant transmission needs to be performed. When the second bit is 0, it may indicate that redundant transmission does not need to be performed, or vice versa. Details are not described herein.

In another possible example, the user plane function network element determines, based on the first data packet, a first forwarding rule (FAR) associated with a downlink data packet detection rule, where the first forwarding rule includes first indication information. For example, the user plane function network element may determine the downlink data packet detection rule based on the first data packet. For a process of determining the downlink data packet detection rule, reference may be made to the foregoing description, and details are not described herein again. The downlink data packet detection rule may include an identifier of the associated first forwarding rule, and the user plane function network element determines the first forwarding rule based on the identifier of the first forwarding rule. The first indication information may be a data packet replication indication, indicating the user plane function network element to perform redundant transmission, that is, indicating the user plane function network element to replicate a received downlink data packet. For a manner of carrying the first indication information in the first forwarding rule, refer to the foregoing manner of carrying the first indication information in the downlink data packet detection rule. Details are not described herein again. Alternatively, the first forwarding rule may include identification information of the first tunnel and identification information of the second tunnel. The first indication information may be the identification information of the first tunnel and the identification information of the second tunnel. In other words, when the first forwarding rule includes the identification information of the first tunnel and the identification information of the second tunnel, the user plane function network element is indicated to perform redundant transmission. The identification information of the first tunnel and the identification information of the second tunnel may be identification information of the access network device.

S203: The user plane function network element replicates the first data packet based on the first indication information, to obtain a second data packet. The second data packet may also be referred to as a replicated downlink data packet.

Optionally, the first forwarding rule may further include second indication information, and the second indication information indicates the user plane function network element to add a same sequence number to the original downlink data packet and the replicated downlink data packet, that is, the first data packet and the second data packet. The user plane function network element may add a first sequence number to the first data packet and the second data packet based on the second indication information.

For a manner of carrying the second indication information in the first forwarding rule, refer to the foregoing manner of carrying the first indication information in the downlink data packet detection rule. Details are not described herein again.

S204: The user plane function network element sends the first data packet and the second data packet to the access network device via the first tunnel and the second tunnel respectively, where the first data packet and the second data packet carry a first sequence number. Correspondingly, the access network device receives the first data packet and the second data packet from the user plane function network element via the first tunnel and the second tunnel.

Optionally, the first tunnel and the second tunnel may be referred to as general packet radio service tunneling protocol user plane (GTP-U) tunnels, or the first tunnel and the second tunnel may be referred to as N3 channels, or the like.

S205: The access network device forwards the first data packet to the terminal device or drops the first data packet based on the first sequence number carried in the first data packet.

For example, after receiving the first data packet via the first tunnel, the access network device may determine service data flow context corresponding to the first data packet. The access network device determines whether the service data flow context includes the first sequence number. If the service data flow context includes the first sequence number, the access network device may consider the first data packet as a replicated data packet, and the access network device drops the data packet, and deletes the first sequence number from the service data flow context. If the service data flow context does not include the first sequence number, the access network device may consider the first data packet as an original data packet, forward the first data packet to the terminal device, and add the first sequence number to the service data flow context.

S206: The access network device forwards the second data packet to the terminal device or drops the second data packet based on the first sequence number carried in the second data packet.

A process in which the access network device processes the second data packet received via the second tunnel is similar to a process in which the access network device processes the first data packet. Details are not described herein again. It may be understood that if the access network device forwards the first data packet to the terminal device, the access network device drops the second data packet. Alternatively, if the access network device forwards the second data packet to the terminal device, the access network device drops the first data packet.

It can be learned from the foregoing functions that the user plane function network element replicates the received downlink data packet, and sends the original downlink data packet and the replicated downlink data packet to the access network device via the first tunnel and the second tunnel respectively. When the network operates properly, the access network device may forward a downlink data packet received earlier, and drop a downlink data packet received later. When a network fault occurs, if one downlink data packet is lost, the access network device may receive the other downlink data packet, thereby improving data transmission reliability.

It may be understood that, in the process shown in FIG. 2, if the access network device receives the first data packet earlier than the second data packet, the access network device may forward the first data packet and drop the second data packet. The access network device considers the first data packet as an original data packet, and the second data packet as a replicated data packet. Alternatively, if the access network device receives the second data packet earlier than the first data packet, the access network device may forward the second data packet and drop the first data packet. The access network device considers the second data packet as an original data packet, and the first data packet as a replicated data packet.

An example is provided for downlink data transmission in the process shown in FIG. 2. In this example, the first tunnel is a first GTP-U tunnel, the second tunnel is a second GTP-U tunnel, the first indication information is a redundant transmission indication, and the second indication information is a sequence number addition indication. It may be understood that, in the downlink data transmission example, both the first GTP-U tunnel and the second GTP-U tunnel are downlink data transmission tunnels.

Figure 3:
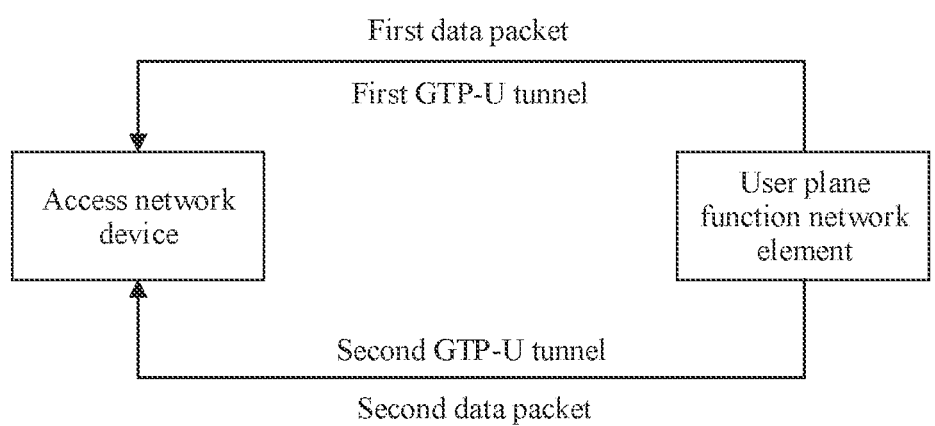
FIG. 3 is a schematic diagram of downlink data transmission according to an embodiment of this application.

As shown in FIG. 3, after a user plane function network element receives a downlink data packet (which may be referred to as a first data packet) from a data network, the user plane function network element may determine a downlink data packet detection rule based on information (for example, a source IP address, a destination IP address, a source port number, or a destination port number of the first data packet) included in the first data packet, and determine, based on a redundant transmission indication in the downlink data packet detection rule, that the received data packet needs to be replicated. Then, the user plane function network element replicates the first data packet to obtain a second data packet. The user plane function network element forwards the first data packet and the second data packet based on the first forwarding rule associated with the downlink data packet detection rule. For example, the user plane function network element may add a same sequence number to the first data packet and the second data packet based on a sequence number addition indication included in the first forwarding rule, and send the first data packet and the second data packet to the access network device via the first GTP-U tunnel and the second GTP-U tunnel respectively.

After receiving the first data packet or the second data packet, the access network device obtains the sequence number in the first data packet or the second data packet, and determines whether a same sequence number is stored in service data flow context corresponding to the first data packet or the second data packet. If there is no such sequence number, the access network device may consider the first data packet or the second data packet as an original data packet, forward the first data packet or the second data packet to the user equipment, and store the sequence number in the service data flow context. If there is a same sequence number, the access network device may consider the first data packet or the second data packet as a replicated data packet, drop the data packet, and delete the sequence number from the service data flow context.

Figure 4:
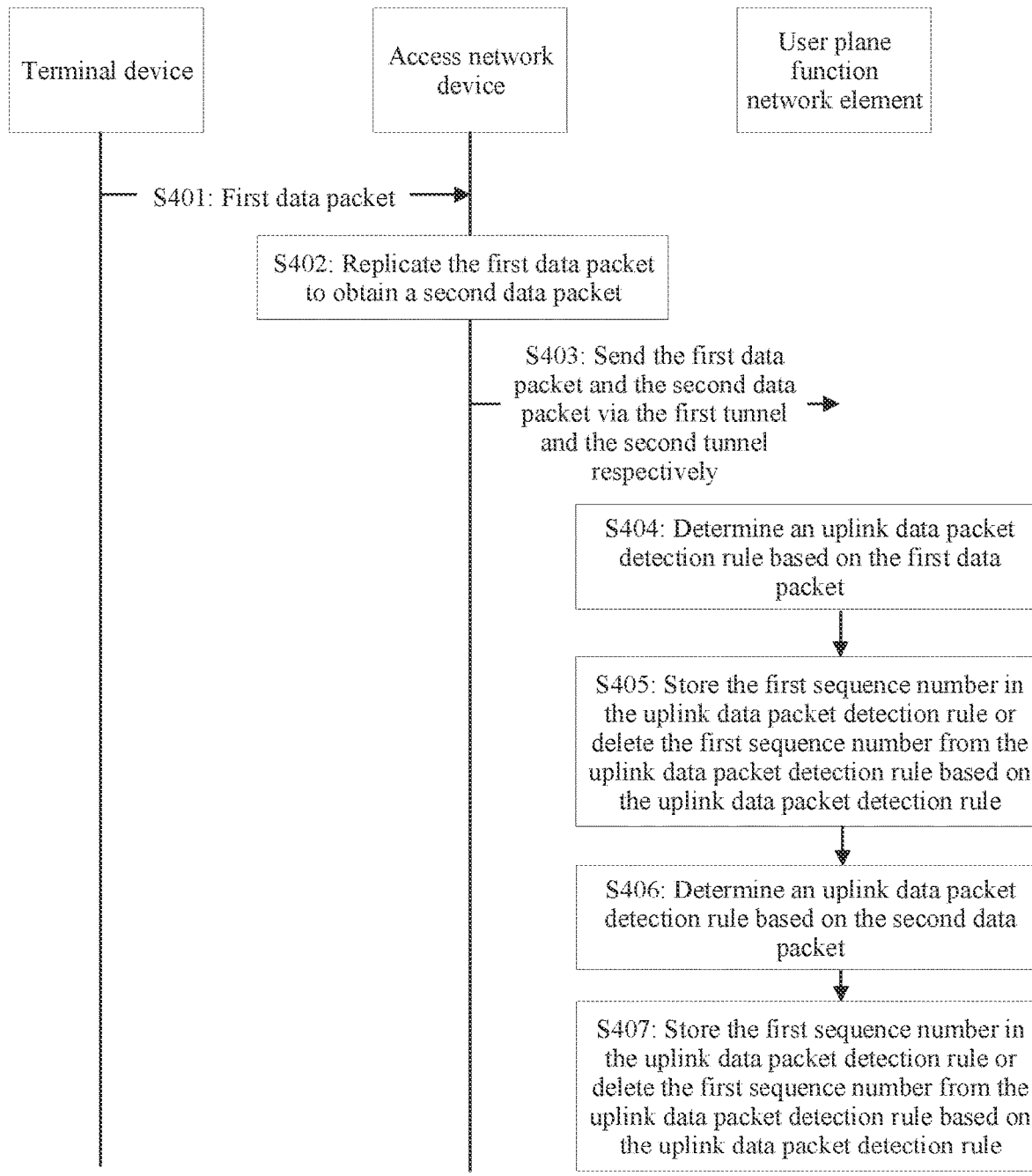
FIG. 4 is another schematic flowchart of a data transmission method according to an embodiment of this application.

As shown in FIG. 4, a process of a data transmission method is provided. The process may be applied to uplink data transmission. A first tunnel and a second tunnel in the process are uplink data transmission tunnels. Execution bodies of the process include a terminal device, an access network device, a user plane function network element, a data network, and the like. Alternatively, the terminal device in the process may be a component (for example, a processor, a chip, or a chip system) in the terminal device, the access network device in the process may be a component (for example, a processor, a chip, or a chip system) in the access network device, the user plane function network element in the process may be a component (for example, a processor, a chip, or a chip system) in the user plane function network element, and the data network in the process may be a component (for example, a processor, a chip, or a chip system) in the data network. The process includes the following steps.

S401: The terminal device sends a first data packet to the access network device, where the first data packet may be referred to as an original uplink data packet. Correspondingly, the access network device receives the first data packet from the terminal device.

S402: The access network device replicates the first data packet to obtain a second data packet, where the second data packet may be referred to as a replicated uplink data packet.

S403: The access network device sends the first data packet and the second data packet to the user plane function network element via the first tunnel and the second tunnel respectively, where the first data packet and the second data packet carry a first sequence number. Correspondingly, the user plane function network element receives the first data packet and the second data packet from the access network device via the first tunnel and the second tunnel respectively.

In a possible example, the access network device may determine service data flow context corresponding to the first data packet, and replicate the first data packet based on a first indication in the service data flow context, to obtain the second data packet. Further, the access network device separately adds the first sequence number to the first data packet and the second data packet based on a second indication in the service data flow context.

S404: The user plane function network element determines an uplink data packet detection rule based on the first data packet.

For example, the user plane function network element may match one or more uplink data packet detection rules based on matching information, such as a tunnel endpoint identifier included in the first data packet. When an uplink data packet detection rule includes the same matching information, the uplink data packet detection rule is the determined uplink data packet detection rule.

S405: The user plane function network element stores the first sequence number in the uplink data packet detection rule or deletes the first sequence number from the uplink data packet detection rule based on the uplink data packet detection rule.

In a possible implementation, the uplink data packet detection rule may include third indication information, and the third indication information may indicate the user plane function network element to detect a redundant data packet. The user plane function network element may store the first sequence number in the uplink data packet detection rule, or delete the first sequence number from the uplink data packet detection rule based on the third indication information. For example, when the uplink data packet detection rule includes the first sequence number, the first data packet may be considered as a replicated data packet, the first sequence number is deleted from the uplink data packet detection rule, and the first data packet is dropped. Alternatively, when the uplink data packet detection rule does not include the first sequence number, the first data packet may be considered as an original data packet, the first sequence number is stored in the uplink data packet detection rule, and the first data packet is forwarded.

The third indication information may be carried in the following manners.

1. A parameter is added to the uplink data packet detection rule, and the parameter is the third indication information.

For example, the parameter may be indicated by one bit. When the bit is set to 1, it indicates that a redundant data packet needs to be detected. When the bit is set to 0, it indicates that a redundant data packet does not need to be detected or indicates no special meaning. Alternatively, the bit is set to 0, it indicates that a redundant data packet needs to be detected. When the bit is set to 1, it indicates that a redundant data packet does not need to be detected or indicates no special meaning. Alternatively, the parameter may be indicated in an enumeration manner. For example, a specific enumerated value is used to indicate that a redundant data packet needs to be detected.

2. An original parameter in the uplink data packet detection rule is extended, and the extended parameter is the third indication information. For example, the uplink data packet detection rule includes an original parameter, and the original parameter includes two bits: a first bit and a second bit. The first bit of the original parameter has a specific meaning, and the second bit has no specific meaning. In this embodiment of this application, the second bit of the original parameter may be used to indicate whether a redundant data packet needs to be detected. For example, when the second bit is 0, it may indicate that a redundant data packet needs to be detected. When the second bit is 1, it may indicate that a redundant data packet does not need to be detected, or vice versa. Details are not described herein.

Alternatively, the uplink data packet detection rule may include identification information of the first tunnel and identification information of the second tunnel. The third indication information may be the identification information of the first tunnel and the identification information of the second tunnel. In other words, when the uplink data packet detection rule includes the identification information of the first tunnel and the identification information of the second tunnel, the user plane function network element is indicated to detect a redundant data packet. The identification information of the first tunnel and the identification information of the second tunnel may be identification information of the user plane function network element.

In a possible implementation, a second forwarding rule associated with the uplink data packet detection rule may include fourth indication information, and the fourth indication information may indicate the user plane function network element to forward the received data packet or drop the received data packet. The user plane function network element may perform, based on the fourth indication information, an action of dropping the first data packet or forwarding the first data packet. For a manner of carrying the fourth indication information in the second forwarding rule, refer to the manner of carrying the third indication information in the uplink data packet detection rule. Details are not described herein again.

In a possible implementation, the uplink data packet detection rule may be associated with two forwarding rules. One forwarding rule includes fifth indication information, and the fifth indication information may indicate the user plane function network element to forward the received data packet. When the user plane function network element considers the first data packet as an original data packet, the user plane function network element forwards the data packet based on the fifth indication information in the forwarding rule. The other forwarding rule includes sixth indication information, and the sixth indication information may indicate the user plane function network element to drop the received data packet. When the user plane function network element considers the first data packet as a replicated data packet, the user plane function network element drops the data packet according to the sixth indication information in the forwarding rule.

S406: The user plane function network element determines an uplink data packet detection rule based on the second data packet.

S407: The user plane function network element stores the first sequence number in the uplink data packet detection rule or deletes the first sequence number from the uplink data packet detection rule based on the uplink data packet detection rule.

In S406 and S407, a process in which the user plane function network element processes the second data packet is similar to the process in which the user plane function network element processes the first data packet. For details, refer to the foregoing process of processing the first data packet. Details are not described herein again.

According to the foregoing method, the access network device replicates the received uplink data packet, and sends the original uplink data packet and the replicated uplink data packet to the user plane function network element via the first tunnel and the second tunnel respectively. When the network operates properly, the user plane function network element may forward the uplink data packet received earlier, and drop the uplink data packet received later. When a network fault occurs, if one uplink data packet is dropped, the user plane function network element may further receive the other uplink data packet, thereby improving data transmission reliability.

It should be noted that, in the process shown in FIG. 4, if the user plane function network element first receives the first data packet earlier than the second data packet, the user plane function network element considers the first data packet as an original uplink data packet and the second data packet as a replicated uplink data packet, forwards the first data packet, and drops the second data packet. Similarly, if the user plane function network element receives the second data packet earlier than the first data packet, the user plane function network element considers the second data packet as an original uplink data packet and the first data packet as a replicated uplink data packet, forwards the second data packet, and drops the first data packet.

An example is provided for uplink data transmission in the process shown in FIG. 4. In this example, the first tunnel is a first GTP-U tunnel, the second tunnel is a second GTP-U tunnel, the third indication information is a replicated packet detection indication, and the fourth indication information is a replicated packet elimination indication. In this example, the first GTP-U tunnel and the second GTP-U tunnel are uplink data transmission tunnels.

Figure 5:
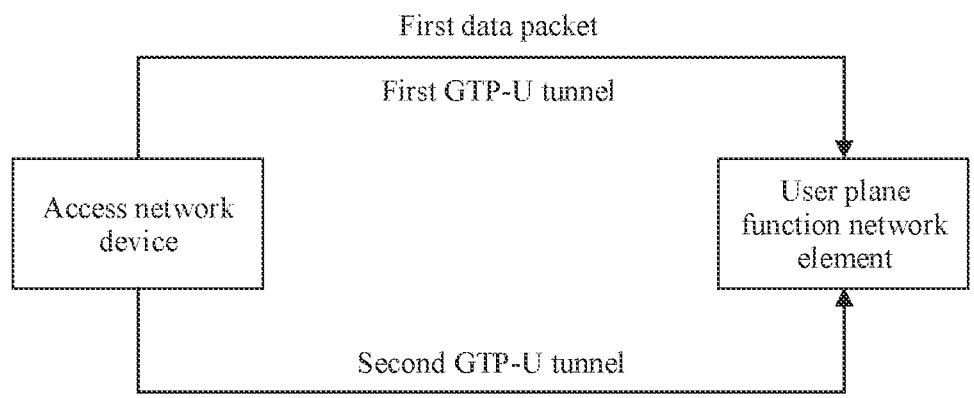
FIG. 5 is a schematic diagram of uplink data transmission according to an embodiment of this application.

As shown in FIG. 5, when an access network device receives a data packet, which is referred to as a first data packet, from a terminal device, the access network device learns that the received data packet needs to be replicated, the access network device replicates the data packet, which is referred to as a second data packet. The access network device adds a same sequence number to the first data packet and the second data packet, and sends the first data packet and the second data packet to the user plane function network element via the first GTP-U tunnel and the second GTP-U tunnel respectively.

After the user plane function network element receives the first data packet or the second data packet from the access network device, the user plane function network element may match an uplink data packet detection rule based on information (for example, a tunnel endpoint identifier) included in the data packet. If there is no sequence number in the matched uplink data packet detection rule, or there is no sequence number that is the same as a sequence number included in the data packet, the data packet is considered as an original data packet, and the user plane function network element stores the sequence number in the data packet in the uplink data packet detection rule. If the matched uplink data packet detection rule includes a sequence number, and the sequence number is the same as a sequence number included in the data packet, the data packet is considered as a replicated data packet, and the user plane function network element deletes the same sequence number from the uplink data packet detection rule.

It should be noted that the uplink data packet detection rule may store one or more sequence numbers in a queue. A queue length indicating a maximum quantity of sequence numbers that can be stored may be set for the queue. For example, the queue length of 1000 indicates that no more sequence number can be stored after the quantity of sequence numbers reaches 1000. Alternatively, a timer may be set for the sequence number, and after the timer expires, the sequence number is deleted.

For example, if the user plane function network element receives a data packet whose sequence number is 1 via the first GTP-U tunnel, and the uplink data packet detection rule does not store a sequence number 1, the user plane function network element stores the sequence number 1 in the uplink data packet detection rule. If the user plane function network element further receives a data packet whose sequence number is 3 via the second tunnel, and the uplink data packet detection rule does not store a sequence number 3, the user plane function network element also stores the sequence number 3 in the uplink data packet detection rule. Subsequently, if the user plane function network element receives a data packet whose sequence number is 1 via the second tunnel, the user plane function network element deletes the sequence number 1 from the uplink data packet detection rule.

It should be noted that the user plane function network element may implement sequential transmission based on sequence numbers, which means that the sequence numbers are required to be in ascending order. In the foregoing example, when the user plane function network element receives the uplink data packet whose sequence number is 3 from the first GTP-U tunnel, the user plane function network element buffers the uplink data packet. After receiving and forwarding the data packet whose sequence number is 2, the user plane function network element forwards the uplink data packet whose sequence number is 3.

Further, the uplink data packet detection rule may not include the replicated packet detection indication. The user plane function network element learns, based on two tunnel identifiers of the user plane function network element included in the uplink data packet detection rule, that replicated packet detection needs to be performed. In other words, the two tunnel identifiers of the user plane function network element function as the replicated packet detection indication.

Figure 6:
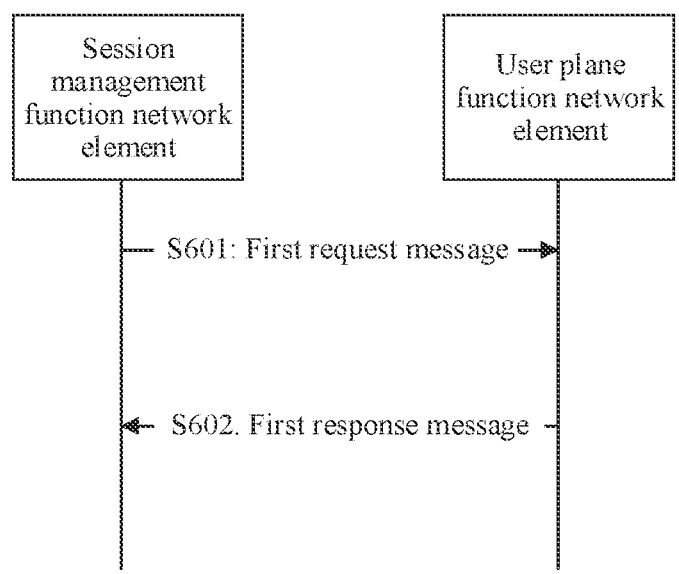
FIG. 6 is a schematic flowchart of a tunnel setup or update method according to an embodiment of this application.

The user plane function network element forwards the first data packet and the second data packet based on the FAR associated with the uplink data packet detection rule. For example, the user plane function network element may forward the first data packet to the data network and drop the second data packet, or drop the first data packet and forward the second data packet to the data network based on the replicated packet elimination indication included in the FAR As shown in FIG. 6, a process of a tunnel establishment or update method is provided. The process may be used for setup or update of an uplink data transmission tunnel or a downlink data transmission tunnel between an access network device and a user plane function network element. For ease of description, the uplink data transmission tunnel and the downlink data transmission tunnel are collectively referred to as tunnels in the following process. The process may be performed in a service request procedure, packet data unit (PDU) session establishment procedure, PDU session update procedure, handover or registration area update procedure, or the like. This is not limited. Execution bodies of the process include a session management function network element and the user plane function network element. It may be understood that the session management function network element may alternatively be a component (for example, a processor, a chip, or a chip system) in the session management function network element, and the user plane function network element may alternatively be a component (for example, a processor, a chip, or a chip system) in the user plane function network element. The process includes the following steps.

S601: The session management function network element sends a first request message to the user plane function network element, where the first request message requests setup or update of a transmission tunnel between the user plane function network element and the access network device. Correspondingly, the user plane function network element receives the first request message from the session management function network element.

In a possible implementation, the first request message may be a packet forwarding control protocol (PFCP) session establishment/update request message.

S602: The user plane function network element sends a first response message to the session management function network element. Correspondingly, the session management function network element receives the first response message from the user plane function network element.

In a possible implementation, the first response message may be a PFCP session establishment/update response message.

The first request message includes one or more of the following parameters;

an uplink data packet detection rule, where the uplink data packet detection rule includes first indication information, and the first indication information indicates the user plane function network element to detect a redundant data packet;

a first forwarding rule associated with the uplink data packet detection rule, where the first forwarding rule includes second indication information, and the second indication information indicates the user plane function network element to drop a data packet or forward a data packet;

a downlink data packet detection rule, where the downlink data packet detection rule includes third indication information, and the third indication information indicates the user plane function network element to perform redundant transmission; and a second forwarding rule associated with the downlink data packet detection rule, where the second forwarding rule includes third indication information and/or fourth indication information, the third indication information indicates the user plane function network element to perform redundant transmission, and the fourth indication information indicates the user plane function network element to add a same sequence number to a received downlink data packet and the replicated downlink data packet.

It can be learned from the foregoing description that when the first tunnel and the second tunnel are used for uplink data transmission, that is, the first tunnel and the second tunnel are uplink data transmission tunnels, identification information of the first tunnel and identification information of the second tunnel may be identification information of the user plane function network element.

Optionally, if the identification information of the first tunnel and the identification information of the second tunnel are allocated by the session management network element, the first request message may further include first identification information allocated by the session management network element to the first tunnel and second identification information allocated by the session management network element to the second tunnel. The first identification information includes a first internet protocol (IP) address and/or a first tunnel endpoint identifier (TEID) of the user plane function network element. The second identification information may include a second IP address and/or a second TEID of the user plane function network element. The identification information of the first tunnel and the identification information of the second tunnel may be included in the uplink data packet detection rule and used for setup of the uplink data transmission tunnel.

Alternatively, if the identification information of the first tunnel and the identification information of the second tunnel are allocated by the user plane function network element, the first response message may include first identification information allocated by the user plane function network element to the first tunnel and second identification information allocated by the user plane function network element to the second tunnel. Similarly, the first identification information may include a first IP address and/or a first TEID of the user plane function network element, and the second identification information may include a second IP address and/or a second TEID of the user plane function network element. The identification information of the first tunnel and the identification information of the second tunnel may be included in the uplink data packet detection rule, and used for setup of the uplink data transmission tunnel.

Similarly, it can be learned from the foregoing description that when the first tunnel and the second tunnel are used for downlink data transmission, that is, the first tunnel and the second tunnel are downlink data transmission tunnels, the identification information of the first tunnel and the identification information of the second tunnel may be identification information of the access network device.

Optionally, if the identification information of the first tunnel and the identification information of the second tunnel are allocated by the access network device, the first request message may further include first identification information allocated by the access network device to the first tunnel and second identification information allocated by the access network device to the second tunnel. The first identification information may include a first IP address and/or a first TEID of the access network device, and the second identification information may include a second IP address and/or a second TEID of the access network device. The identification information of the first tunnel and the identification information of the second tunnel may be included in the second forwarding rule associated with the downlink data packet detection rule, and are used for setup of the downlink data transmission tunnel.

According to the foregoing method, the foregoing parameters may be configured for the user plane function network element in a redundant tunnel setup or update procedure to implement redundant transmission.

It may be understood that in the foregoing method embodiments, the methods and operations implemented by the user plane function network element may alternatively be implemented by a component (for example, a chip or a circuit) in the user plane function network element. The methods and operations implemented by the session management function network element may alternatively be implemented by a component (for example, a chip or a circuit) in the session management function network element. In the methods provided in embodiments of this application, the methods provided in embodiments of this application are separately described from perspectives of interaction between the terminal device, the access network device, the user plane function network element, and the data network. To implement the functions in the methods provided in the embodiments of this application, the user plane function network element and the session management function network element may include a hardware structure and/or a software unit, and use the hardware structure, the software unit, or a combination of the hardware structure and the software unit. Whether a function in the foregoing functions is implemented by using the hardware structure, the software unit, or the combination of the hardware structure and the software unit depends on particular applications and design constraints of the technical solutions.

The methods provided in embodiments of this application are described above in detail with reference to FIG. 1 to FIG. 6. Apparatuses provided in embodiments of this application are described below in detail with reference to FIG. 7 and FIG. 8. It should be understood that descriptions of apparatus embodiments correspond to the descriptions of the method embodiments. Therefore, for content that is not described in detail, refer to the descriptions in the foregoing method embodiments.

Figure 7:
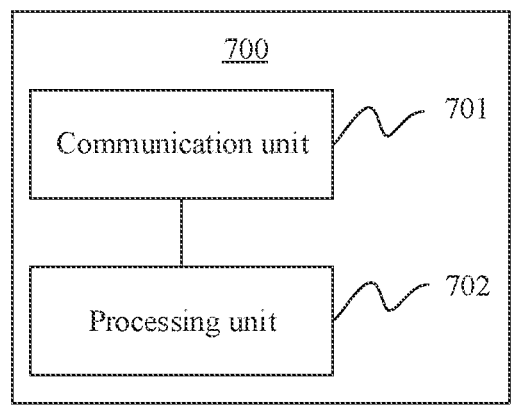
FIG. 7 is a schematic diagram of a structure of an apparatus according to an embodiment of this application.

FIG. 7 is a schematic block diagram of an apparatus 700 according to an embodiment of this application. The apparatus 700 is configured to implement the functions of the user plane function network element or the session management function network element in the foregoing method. For example, the apparatus may be a software unit or a chip system. The chip system may include a chip, or may include a chip and another discrete component. The apparatus includes a communication unit 701, and may further include a processing unit 702. The communication unit 701 may communicate with an external system. The processing unit 702 is configured to perform processing, for example, replicating a first data packet based on first indication information. The communication unit 701 may also be referred to as a communication interface, a transceiver unit, an input/output interface, or the like. For example, the communication unit 701 may include a sending unit and/or a receiving unit, respectively configured to perform the sending or receiving steps of the user plane function network element or the session management function network element in the process shown in FIG. 2, FIG. 4, or FIG. 6.

In an example, the apparatus 700 may implement the steps performed by the user plane function network element in the process shown in FIG. 2. The apparatus 700 may be the user plane function network element, or a chip or a circuit disposed in the user plane function network element. The communication unit 701 performs receiving and sending operations at the user plane function network element side in the foregoing method embodiments, and the processing unit 702 is configured to perform processing-related operations at the user plane function network element side in the foregoing method embodiments.

For example, the communication unit 701 is configured to receive a first data packet from a data network. The processing unit 702 is configured to determine first indication information based on the first data packet, where the first indication information indicates the user plane function network element to perform redundant transmission. The processing unit 702 is further configured to replicate the first data packet based on the first indication information, to obtain a second data packet. The communication unit 701 is further configured to send the first data packet and the second data packet to an access network device via a first tunnel and a second tunnel respectively, where the first data packet and the second data packet carry a first sequence number.

Optionally, when determining the first indication information based on the first data packet, the processing unit 702 is specifically configured to:

determine a downlink data packet detection rule based on the first data packet, where the downlink data packet detection rule includes the first indication information.

Optionally, when determining the first indication information based on the first data packet, the processing unit 702 is specifically configured to:

determine, based on the first data packet, a first forwarding rule (FAR) associated with a downlink data packet detection rule, where the first FAR includes the first indication information.

Optionally, the first FAR associated with the downlink data packet detection rule further includes second indication information, where the second indication information indicates the user plane function network element to add a sequence number to the first data packet and the second data packet. The processing unit 702 is further configured to: add the first sequence number to the first data packet and the second data packet based on the second indication information.

In another example, the apparatus 700 may implement the steps performed by the user plane function network element in the process shown in FIG. 4. The apparatus 700 may be the user plane function network element, or a chip or a circuit disposed in the user plane function network element. The communication unit 701 performs receiving and sending operations at the user plane function network element side in the foregoing method embodiments, and the processing unit 702 is configured to perform processing-related operations at the user plane function network element side in the foregoing method embodiments.

In an example, the communication unit 701 is configured to receive a first data packet from an access network device via a first tunnel, where the first data packet carries a first sequence number. The processing unit 702 is configured to determine an uplink data packet detection rule based on the first data packet. The processing unit 702 is further configured to: based on the uplink data packet detection rule, store the first sequence number in the uplink data packet detection rule, or delete the first sequence number from the uplink data packet detection rule.

Optionally, the uplink data packet detection rule includes third indication information, where the third indication information indicates the user plane function network element to detect a redundant data packet. When the processing unit 702 stores the first sequence number in the uplink data packet detection rule or deletes the first sequence number from the uplink data packet detection rule based on the uplink data packet detection rule, the processing unit 702 is configured to store the first sequence number in the uplink data packet detection rule or delete the first sequence number from the uplink data packet detection rule based on the third indication information included in the uplink data packet detection rule.

Optionally, when the processing unit 702 stores the first sequence number in the uplink data packet detection rule, the processing unit 702 is specifically configured to: store the first sequence number in the uplink data packet detection rule if the uplink data packet detection rule does not include the first sequence number.

Optionally, when the processing unit 702 deletes the first sequence number from the uplink data packet detection rule, the processing unit 702 is configured to: delete the first sequence number from the uplink data packet detection rule if the uplink data packet detection rule includes the first sequence number.

Optionally, the processing unit 702 is further configured to: control the communication unit 701 to forward the first data packet to a data network if the uplink data packet detection rule does not include the first sequence number; or drop the first data packet if the uplink data packet detection rule includes the first sequence number.

Optionally, when the processing unit 702 controls the communication unit 701 to forward the first data packet to the data network if the uplink data packet detection rule does not include the first sequence number, the processing unit 702 is specifically configured to: if the uplink data packet detection rule does not include the first sequence number, forward the first data packet to the data network based on fourth indication information included in a second forwarding rule FAR associated with the uplink data packet detection rule, where the fourth indication information indicates the user plane function network element to forward an original uplink data packet or drop a replicated uplink data packet.

Optionally, when the processing unit 702 drops the first data packet if the uplink data packet detection rule includes the first sequence number, the processing unit 702 is specifically configured to: if the uplink data packet detection rule includes the first sequence number, drop the first data packet based on fourth indication information included in a second forwarding rule FAR associated with the uplink data packet detection rule, where the fourth indication information indicates the user plane function network element to forward an original uplink data packet or drop a replicated uplink data packet.

In an example, the apparatus 700 may implement the steps performed by the session management function network element in the process shown in FIG. 6. The apparatus 700 may be the session management function network element, or a chip or a circuit disposed in the session management function network element. The communication unit 701 is configured to perform sending and receiving related operations of the session management function network element in the foregoing method embodiments, and the processing unit 702 is configured to perform processing-related operations of the session management function network element in the foregoing method embodiments.

In an example, the communication unit 701 is configured to send a first request message to the user plane function network element, where the first request message requests setup or update of a transmission tunnel between the user plane function network element and the access network device. The communication unit 701 is further configured to receive a first response message from the user plane function network element.

The first request message includes one or more of the following parameters:

a downlink data packet detection rule, where the downlink data packet detection rule includes first indication information, and the first indication information indicates the user plane function network element to perform redundant transmission; a first forwarding rule (FAR) associated with the downlink data packet detection rule, where the first FAR includes first indication information and/or second indication information, the first indication information indicates the user plane function network element to perform redundant transmission, and the second indication information indicates the user plane function network element to add a same sequence number to a received downlink data packet and a replicated downlink data packet; an uplink data packet detection rule, where the uplink data packet detection rule includes third indication information, and the third indication information indicates the user plane function network element to detect a redundant data packet; and a second FAR associated with the uplink data packet detection rule, where the second FAR includes fourth indication information, and the fourth indication information indicates the user plane function network element to forward an original uplink data packet or drop a replicated uplink data packet.

In embodiments of this application, division into the units is an example, and is only division into logical functions. In actual implementation, another division may be used. In addition, functional units in embodiments of this application may be integrated into one processor, or each of the units may exist alone physically, or two or more units may be integrated into one unit. The integrated unit may be implemented in a form of hardware, or may be implemented in a form of a software function unit.

It may be understood that in the foregoing embodiments, the functions of the communication unit may be implemented by a transceiver, and the functions of the processing unit may be implemented by a processor. The transceiver may include a transmitter and/or a receiver, respectively configured to implement functions of a sending unit and/or a receiving unit. The following provides description by using an example with reference to FIG. 8.

Figure 8:
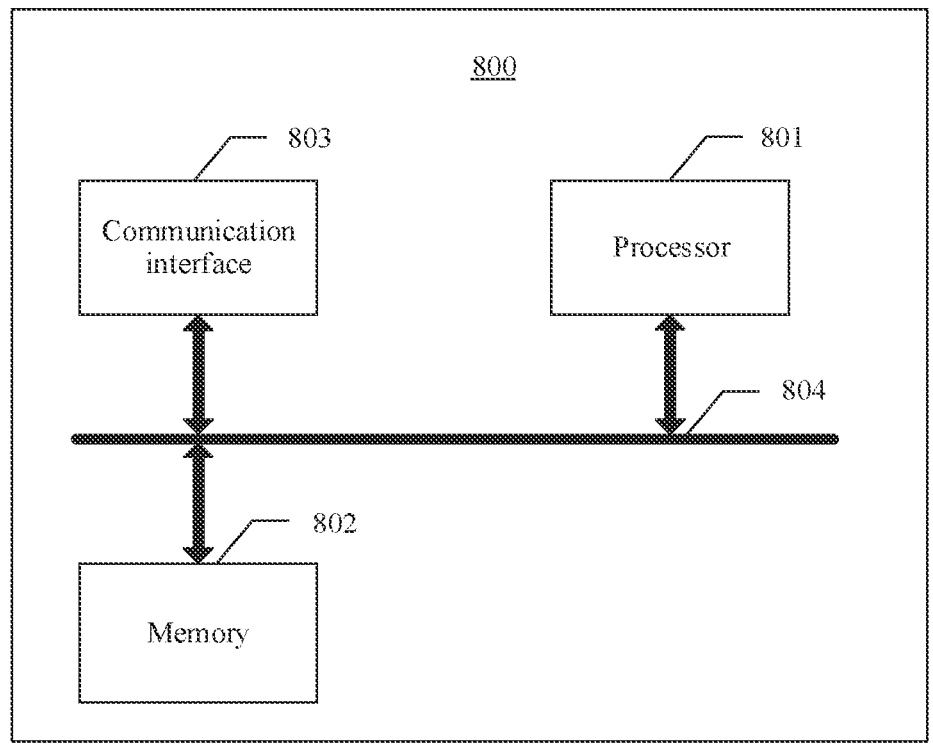
FIG. 8 is another schematic diagram of a structure of an apparatus according to an embodiment of this application.

FIG. 8 is a schematic block diagram of an apparatus 800 according to an embodiment of this application. The apparatus 800 shown in FIG. 8 may be an implementation of a hardware circuit of the apparatus shown in FIG. 7. The apparatus may be applicable to the processes shown in FIG. 2, FIG. 4, or FIG. 6, and perform the functions of the user plane function network element or the session management function network element in the foregoing method embodiments. For ease of description, FIG. 8 shows only main components of the communication apparatus.

The communication apparatus 800 shown in FIG. 8 includes at least one processor 801. The communication apparatus 800 may further include at least one memory 802, configured to store program instructions and/or data. The memory 802 is coupled to the processor 801. The coupling in this embodiment of this application is an indirect coupling or a communication connection between apparatuses, units, or modules, may be in an electrical form, a mechanical form, or another form, and is used for information exchange between the apparatuses, the units, or the modules. The processor 801 may perform an operation cooperatively with the memory 802. The processor 801 may execute program instructions stored in the memory 802. At least one of the at least one memory 802 may be included in the processor 801.

The apparatus 800 may further include a communication interface 803, configured to communicate with another device through a transmission medium, so that the communication apparatus 800 may communicate with the another device. In embodiments of this application, the communication interface may be a transceiver, a circuit, a bus, a module, or a communication interface of another type. In this embodiment of this application, when the communication interface is a transceiver, the transceiver may include an independent receiver and an independent transmitter, or may be a transceiver integrated with a transceiver function, or may be an interface circuit.

It should be understood that a connection medium between the processor 801, the memory 802, and the communication interface 803 is not limited in this embodiment of this application. In this embodiment of this application, the memory 802, the processor 801, and the communication interface 803 are connected via a communication bus 804 in FIG. 8, the bus is represented by a bold line in FIG. 8, and a manner of connection between other components is merely an example for description. This is not limited. The bus may include an address bus, a data bus, a control bus, and the like. For ease of representation, only one thick line is used to represent the bus in FIG. 8, but this does not mean that there is only one bus, only one type of bus, or the like.

In an example, the apparatus 800 is configured to implement the steps performed by the user plane function network element in the process shown in FIG. 2. The communication interface 803 is configured to perform sending and receiving related operations at the user plane function network element side in the foregoing embodiments, and the processor 801 is configured to perform processing-related operations at the user plane function network element side in the foregoing method embodiments.

For example, the communication interface 803 is configured to receive a first data packet from a data network. The processor 801 is configured to determine first indication information based on the first data packet, where the first indication information indicates the user plane function network element to perform redundant transmission. The processor 801 is further configured to replicate the first data packet based on the first indication information, to obtain a second data packet. The communication interface 803 is further configured to send the first data packet and the second data packet to an access network device via a first tunnel and a second tunnel respectively, where the first data packet and the second data packet carry a first sequence number.

Optionally, when determining the first indication information based on the first data packet, the processor 801 is specifically configured to:
determine a downlink data packet detection rule based on the first data packet, where the downlink data packet detection rule includes the first indication information.

Optionally, when determining the first indication information based on the first data packet, the processor 801 is specifically configured to:
determine, based on the first data packet, a first forwarding rule (FAR) associated with a downlink data packet detection rule, where the first FAR includes the first indication information.

Optionally, the first FAR associated with the downlink data packet detection rule further includes second indication information, where the second indication information indicates the user plane function network element to add a sequence number to the first data packet and the second data packet. The processor 801 is further configured to: add the first sequence number to the first data packet and the second data packet based on the second indication information.

In an example, the apparatus 800 is configured to implement the steps performed by the user plane function network element in the process shown in FIG. 4. The communication interface 803 is configured to perform sending and receiving related operations at the user plane function network element side in the foregoing embodiments, and the processor 801 is configured to perform processing-related operations at the user plane function network element side in the foregoing method embodiments.

In an example, the communication interface 803 is configured to receive a first data packet from an access network device via a first tunnel, where the first data packet carries a first sequence number. The processor 801 is configured to determine an uplink data packet detection rule based on the first data packet. The processor 801 is further configured to: store the first sequence number in the uplink data packet detection rule, or delete the first sequence number from the uplink data packet detection rule based on the uplink data packet detection rule.

Optionally, the uplink data packet detection rule includes third indication information, where the third indication information indicates the user plane function network element to detect a redundant data packet. When the processor 801 stores the first sequence number in the uplink data packet detection rule or deletes the first sequence number from the uplink data packet detection rule based on the uplink data packet detection rule, the processor 801 is specifically configured to: store the first sequence number in the uplink data packet detection rule or delete the first sequence number from the uplink data packet detection rule based on the third indication information included in the uplink data packet detection rule.

Optionally, when storing the first sequence number in the uplink data packet detection rule, the processor 801 is specifically configured to: store the first sequence number in the uplink data packet detection rule if the uplink data packet detection rule does not include the first sequence number.

Optionally, when deleting the first sequence number from the uplink data packet detection rule, the processor 801 is configured to: delete the first sequence number from the uplink data packet detection rule if the uplink data packet detection rule includes the first sequence number.

Optionally, the processor 801 is further configured to: control the communication interface 803 to forward the first data packet to a data network if the uplink data packet detection rule does not include the first sequence number; or drop the first data packet if the uplink data packet detection rule includes the first sequence number.

Optionally, when the processor 801 controls the communication interface 803 to forward the first data packet to the data network if the uplink data packet detection rule does not include the first sequence number, the processor 801 is configured to: if the uplink data packet detection rule does not include the first sequence number, forward the first data packet to a data network based on fourth indication information included in a second forwarding rule FAR associated with the uplink data packet detection rule, where the fourth indication information indicates the user plane function network element to forward an original uplink data packet or drop a replicated uplink data packet.

Optionally, when the processor drops the first data packet if the uplink data packet detection rule includes the first sequence number, the processor 801 is specifically configured to: if the uplink data packet detection rule includes the first sequence number, drop the first data packet based on fourth indication information included in a second forwarding rule FAR associated with the uplink data packet detection rule, where the fourth indication information indicates the user plane function network element to forward an original uplink data packet or drop a replicated uplink data packet.

In an example, the apparatus 800 is configured to implement the steps performed by the session management function network element in the process shown in FIG. 6. The communication interface 803 is configured to perform sending and receiving related operations on the session management function network element side in the foregoing embodiments, and the processor 801 is configured to perform processing-related operations at the session management function network element side in the foregoing method embodiments.

In an example, the communication interface 803 is configured to send a first request message to the user plane function network element, where the first request message requests setup or update of a transmission tunnel between the user plane function network element and the access network device. The communication interface 803 is further configured to receive a first response message from the user plane function network element.

The first request message includes one or more of the following parameters:

a downlink data packet detection rule, where the downlink data packet detection rule includes first indication information, and the first indication information indicates the user plane function network element to perform redundant transmission; a first forwarding rule (FAR) associated with the downlink data packet detection rule, where the first FAR includes first indication information and/or second indication information, the first indication information indicates the user plane function network element to perform redundant transmission, and the second indication information indicates the user plane function network element to add a same sequence number to a received downlink data packet and a replicated downlink data packet; an uplink data packet detection rule, where the uplink data packet detection rule includes third indication information, and the third indication information indicates the user plane function network element to detect a redundant data packet; and a second FAR associated with the uplink data packet detection rule, where the second FAR includes fourth indication information, and the fourth indication information indicates the user plane function network element to forward an original uplink data packet or drop a replicated uplink data packet.

Further, an embodiment of this application further provides an apparatus. The apparatus is configured to perform the method in the process shown in FIG. 2, configured to perform the method in the process shown in FIG. 4, or configured to perform the method in the process shown in FIG. 6. A computer readable storage medium includes a program. When the program is run by a processor, the method in the process shown in FIG. 2 is performed, or the method in the process shown in FIG. 4 is performed, or the method in the process shown in FIG. 6 is performed. A computer program product, where the computer program product includes computer program code, and when the computer program code is run on a computer, the computer is enabled to implement the method in the process shown in FIG. 2, or the method in the process shown in FIG. 4, or the method in the process shown in FIG. 6. A chip includes: a processor, where the processor is coupled to a memory, the memory is configured to store a program or instructions, and when the program or the instructions are executed by the processor, the apparatus is enabled to perform the method in the process shown in FIG. 2, perform the method in the process shown in FIG. 4, or perform the method in the process shown in FIG. 6.

In embodiments of this application, the processor may be a general-purpose processor, a digital signal processor, an application-specific integrated circuit, a field programmable gate array or another programmable logic device, a discrete gate or transistor logic device, or a discrete hardware component. The processor can implement or execute the methods, steps, and logical block diagrams disclosed in embodiments of this application. The general-purpose processor may be a microprocessor or any conventional processor or the like. The steps of the methods disclosed with reference to embodiments of this application may be directly performed by a hardware processor, or may be performed by using a combination of hardware in the processor and a software module.

In embodiments of this application, the memory may be a non-volatile memory, such as a hard disk drive (HDD) or a solid-state drive (SSD), or may be a volatile memory, such as a random access memory (RAM). The memory is any other medium that can be used to carry or store expected program code in a form of instructions or a data structure and that can be accessed by a computer. However, this is not limited thereto. The memory in embodiments of this application may alternatively be a circuit or any other apparatus that can implement a storage function, and is configured to store program instructions and/or data.

All or some of the methods in embodiments of this application may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person skilled in the art can make various modifications and variations to this application without departing from the scope of this application. In this way, this application is intended to cover these modifications and variations of this application provided that they fall within the scope of protection defined by the following claims and their equivalent technologies of this application.

What is claimed is:

1. A data transmission method, comprising:
    receiving, by a user plane function network element, a first request message from a session management function network element, wherein the first request message requests setup or update of a transmission tunnel between the user plane function network element and an access network device, wherein the first request message comprises a first forwarding rule (FAR) associated with a downlink data packet detection rule, and the first FAR comprises first indication information indicating whether or not the user plane function network element needs to perform redundant transmission;
    receiving, by the user plane function network element, a first data packet from a data network;
    determining, by the user plane function network element based on the first data packet, the first FAR associated with the downlink data packet detection rule;
    in response to the first indication information indicating the user plane function network element needs to perform redundant transmission, replicating, by the user plane function network element, the first data packet based on the first indication information, to obtain a second data packet; and
    sending, by the user plane function network element, the first data packet and the second data packet to an access network device via a first tunnel and a second tunnel respectively, wherein the first data packet and the second data packet comprise a first sequence number.

2. The data transmission method according to claim 1, wherein the first FAR associated with the downlink data packet detection rule further comprises second indication information, and the second indication information indicates the user plane function network element to add a sequence number to the first data packet and the second data packet; and
    the method further comprises:
        adding, by the user plane function network element, the first sequence number to the first data packet and the second data packet based on the second indication information.

3. The data transmission method according to claim 1, wherein the first request message further comprises a second forwarding rule (FAR) associated with an uplink data packet detection rule, wherein the second FAR comprises third indication information, and the third indication information indicates the user plane function network element to drop a replicated uplink data packet.

4. The data transmission method according to claim 3, further comprising:
    receiving, by the user plane function network element, an original uplink data packet and a replicated uplink data packet of the original uplink data packet; and
    dropping, by the user plane function network element according to the third indication information, the replicated uplink data packet.

5. The data transmission method according to claim 4, further comprising:
    determining, by the user plane function network element, the uplink data packet detection rule based on the received original uplink data packet or the replicated uplink data packet.

6. A tunnel setup or update method, comprising:
    sending, by a session management function network element, a first request message to a user plane function network element, wherein the first request message requests setup or update of a transmission tunnel between the user plane function network element and an access network device; and
    receiving, by the session management function network element, a first response message from the user plane function network element, wherein the first request message comprises a first forwarding rule (FAR) associated with a downlink data packet detection rule, wherein the first FAR comprises first indication information indicating whether or not the user plane function network element needs to perform redundant transmission.

7. The method according to claim 6, wherein the first FAR further comprises second indication information, the second indication information indicates the user plane function network element to add a same sequence number to a received downlink data packet and a replicated downlink data packet.

8. The method according to claim 6, wherein the first request message further comprises a second forwarding rule (FAR) associated with an uplink data packet detection rule, wherein the second FAR comprises third indication information, and the third indication information indicates the user plane function network element to drop a replicated uplink data packet.

9. An apparatus, comprising:
    at least one memory storing instructions; and
    at least one processor coupled to the at least one memory, wherein the instructions, when executed by the at least one processor, cause the apparatus to:
        receive a first request message from a session management function network element, wherein the first request message requests setup or update of a transmission tunnel between a user plane function network element and an access network device, wherein the first request message comprises a first forwarding rule (FAR) associated with a downlink data packet detection rule, and the first FAR comprises first indication information indicating whether or not the user plane function network element needs to perform redundant transmission;
        receive a first data packet from a data network;

determine the first FAR associated with the downlink data packet detection rule based on the first data packet, wherein the first indication information indicates the user plane function network element to perform redundant transmission;

in response to the first indication information indicating the user plane function network element needs to perform redundant transmission, replicate the first data packet based on the first indication information to obtain a second data packet; and send the first data packet and the second data packet to an access network device via a first tunnel and a second tunnel respectively, wherein the first data packet and the second data packet comprise a first sequence number.

10. The apparatus according to claim 9, wherein the first FAR associated with the downlink data packet detection rule further comprises second indication information, the second indication information indicates the user plane function network element to add a sequence number to the first data packet and the second data packet, and the apparatus is further caused to:

add the first sequence number to the first data packet and the second data packet based on the second indication information.

11. The apparatus according to claim 9, wherein the first request message further comprises a second forwarding rule (FAR) associated with an uplink data packet detection rule, wherein the second FAR comprises third indication information, and the third indication information indicates the user plane function network element to drop a replicated uplink data packet.

12. The apparatus according to claim 11, wherein the apparatus is further caused to:

receive an original uplink data packet and a replicated uplink data packet of the original uplink data packet; and drop, according to the third indication information, the replicated uplink data packet.

13. The apparatus according to claim 12, wherein the apparatus is further caused to:

determine the uplink data packet detection rule based on the received original uplink data packet or the replicated uplink data packet.

14. An apparatus, comprising:

at least one memory storing instructions; and at least one processor coupled to the at least one memory, wherein the instructions, when executed by the at least one processor, cause the apparatus to:

send a first request message to a user plane function network element, wherein the first request message requests setup or update of a transmission tunnel between the user plane function network element and an access network device; and receive a first response message from the user plane function network element, wherein the first request message comprises a first forwarding rule (FAR) associated with a downlink data packet detection rule, wherein the first FAR comprises first indication information; indicating whether or not the user plane function network element needs to perform redundant transmission.

15. The apparatus according to claim 14, wherein the first FAR further comprises second indication information, the second indication information indicates the user plane function network element to add a same sequence number to a received downlink data packet and a replicated downlink data packet.

16. The apparatus according to claim 14, wherein the first request message further comprises a second forwarding rule (FAR) associated with an uplink data packet detection rule, wherein the second FAR comprises third indication information, and the third indication information indicates the user plane function network element to drop a replicated uplink data packet.

17. The data transmission method according to claim 1, wherein the first FAR further comprises identification information of the first tunnel and identification information of the second tunnel.

18. The data transmission method according to claim 1, wherein when the first indication information is set to 1, the first indication information indicates that the user plane function network element needs to perform redundant transmission.

19. The data transmission method according to claim 1, wherein the first tunnel and the second tunnel are general packet radio service tunnelling protocol user plane (GTP-U) tunnels.

20. The apparatus according to claim 9, wherein the first FAR further comprises identification information of the first tunnel and identification information of the second tunnel.

* * * * *

UNITED STATES PATENT AND TRADEMARK OFFICE
CERTIFICATE OF CORRECTION

PATENT NO. : 12,355,671 B2
APPLICATION NO. : 17/886008
DATED : July 8, 2025
INVENTOR(S) : Caixia Qi, Han Zhou and Hancheng Li Page 1 of 1

It is certified that error appears in the above-identified patent and that said Letters Patent is hereby corrected as shown below:

In the Claims

In Column 30, In Line 14 (Approx.), In Claim 14, delete "information;" and insert -- information --.

Signed and Sealed this
Twenty-third Day of December, 2025

John A. Squires
*Director of the United States Patent and Trademark Office*